United States Patent Office 3,315,303
Patented Apr. 25, 1967

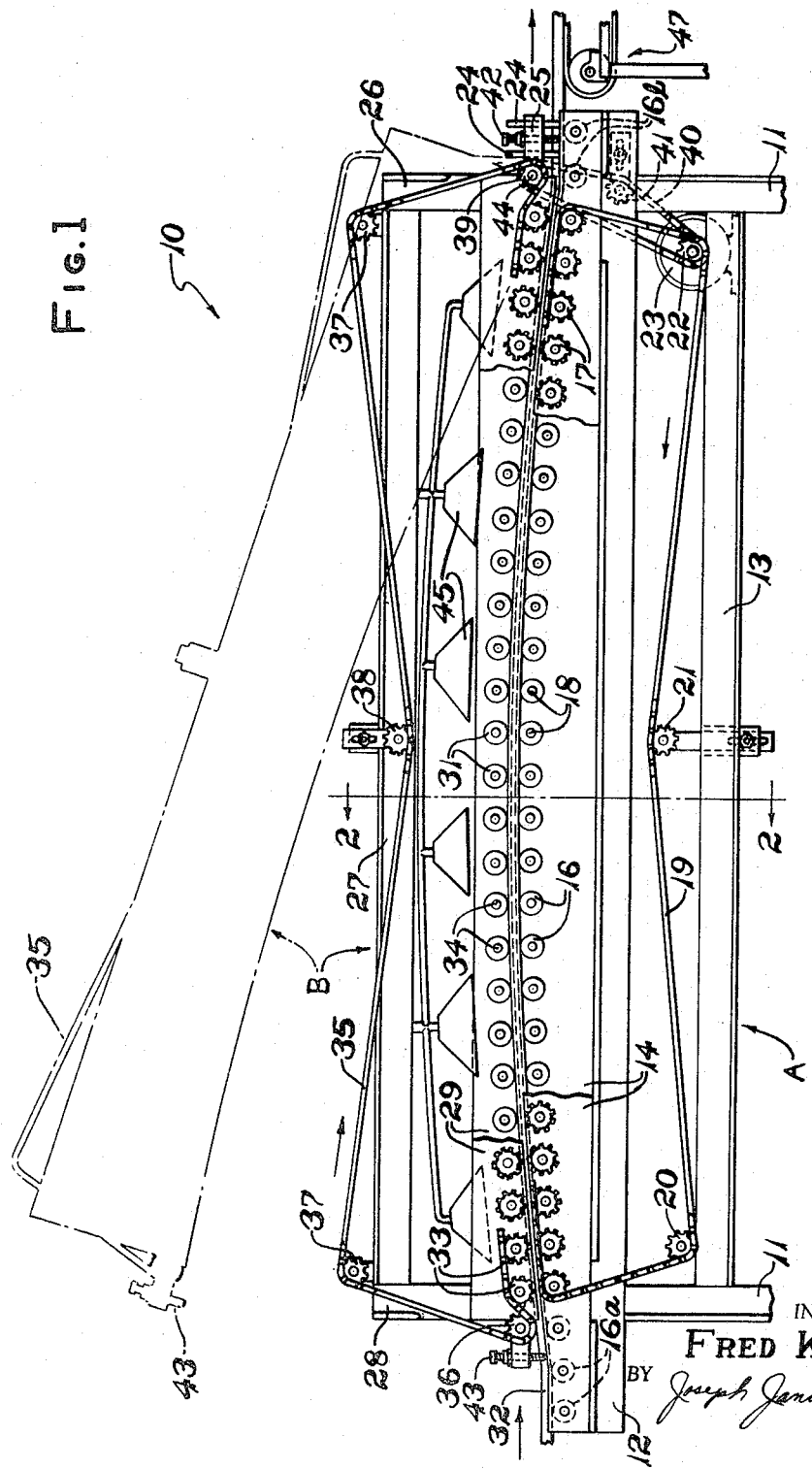

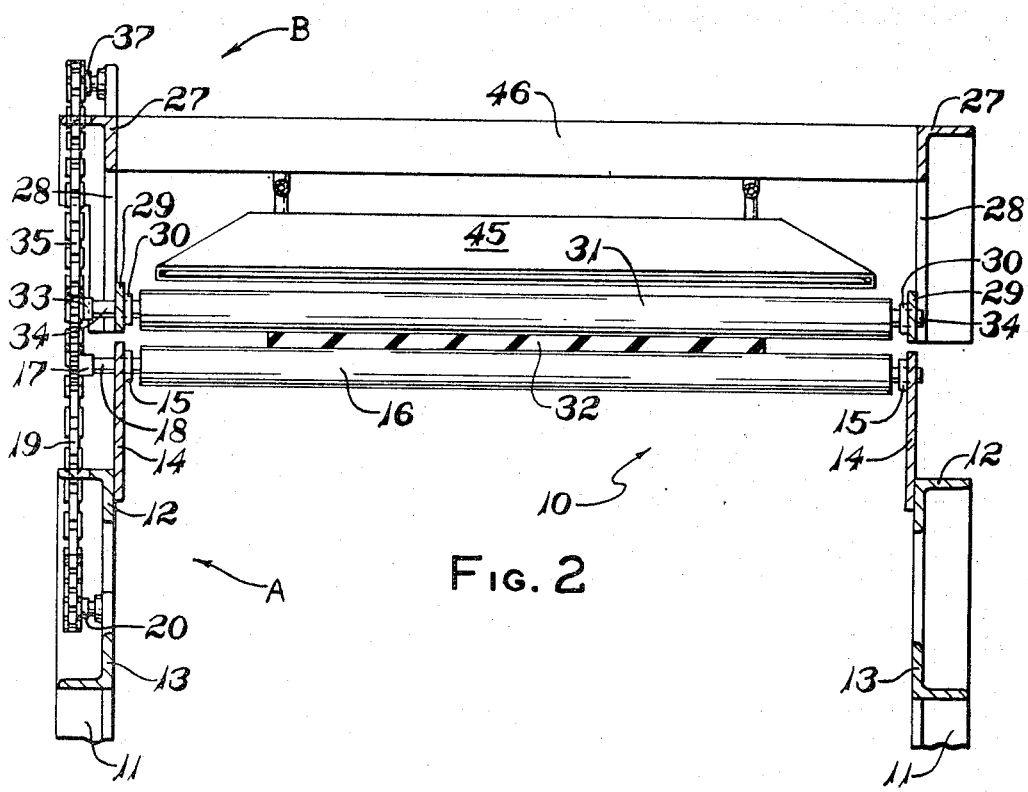
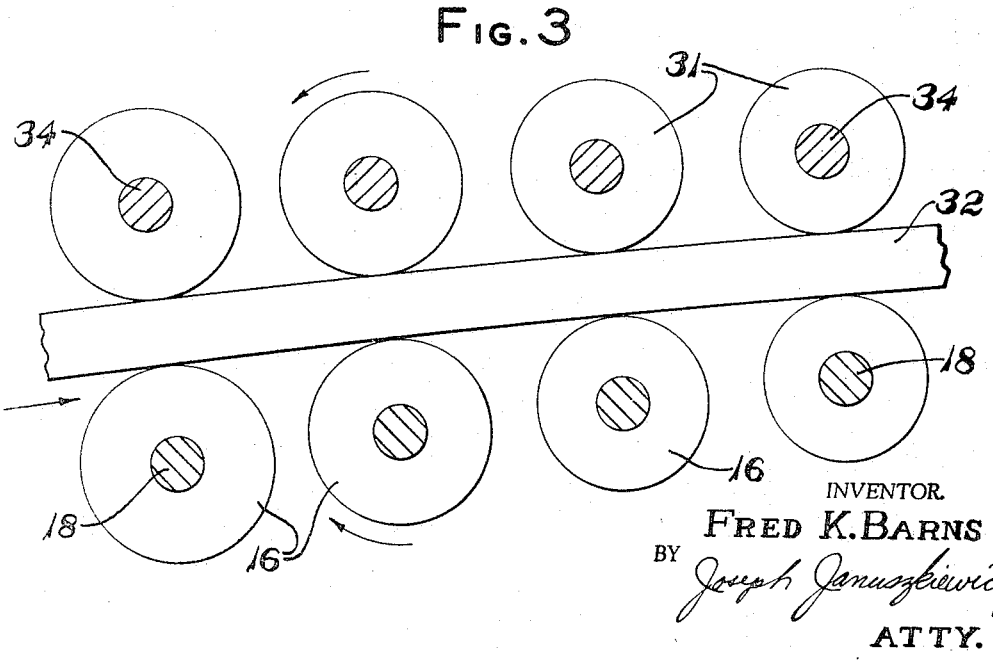

3,315,303
PLASTIC STRIP SHRINKING APPARATUS
Fred K. Barns, Akron, Ohio, assignor to The B. F. Goodrich Company, New York, N.Y., a corporation of New York
Original application Nov. 8, 1962, Ser. No. 236,289. Divided and this application Feb. 18, 1966, Ser. No. 528,436
7 Claims. (Cl. 18—2)

This application is a division of my copending application Ser. No. 236,289 filed Nov. 8, 1962.

This invention pertains to an improved apparatus for the elimination of residual shrinkage in plastic material and, more particularly, to the apparatus which eliminates longitudinal shrinkage in plastic material following its formation into elongated strips or sheets.

This is an improvement of my apparatus as disclosed in my patent for elastomeric strip shrinking apparatus and method, No. 3,011,211. In the manufacture of plastic strip or sheet material in elongated form which may be cut to definite lengths following the forming thereof the problems associated with residual shrinkage due to the relaxation of longitudinal forming forces therein is a serious one, oftentimes resulting in off-size products. For example, in the manufacture of plastic floor tile, wherein the material is sheeted as a first processing step, it is important to be able to trim the sheet to the desired finished size immediately following its formation. If the material is cut before the removal of the residual stresses the material will continue to shrink for a long period of time, particularly when it is packaged immediately after cutting. The mere weight of the material upon itself may prevent those pieces in the bottom of the package from shrinking to their ultimate size. Then, upon application in which the pieces are cemented to a floor, with time the pieces will continue to shrink, resulting in unsightly spaces between adjoining floor tiles. This, of course, is only one specific example of the type of problem which may be encountered, many more similar ones will occur to those skilled in the art. In shrinking plastic material, particularly floor tile sheets wherein the material has a high modulus of elasticity, it is necessary to use an apparatus such as that disclosed in my patent described above. Due to the inherent stiffness of the material the strip material would in some cases buckle above the rollers or the surface of the rollers would merely slide with reference to the strip surface.

It is an object of this invention, therefore, to provide an improved apparatus for producing plastic material in strip or sheet form from which substantially all longitudinal shrinkage has been removed.

A more specific object of this invention is to provide an improved apparatus for forcibly shrinking a strip of plastic material, removing therefrom residual shrinkage and obviating the necessity for postponing cutting of the strip into pieces of desired size until after the strip has shrunk under its own inherent shrinking forces.

A further object of the invention is to provide an apparatus for removing residual shrinkage from elongated plastic material, cooperating with strip forming means whereby longitudinal shrinkage of the strip is forcibly removed while the material is moved from the forming means.

A still further object of the invention is to provide an improved apparatus for shrinking plastic material in strip form wherein the strip material is confined between two series of parallel rollers, each of uniformly decreasing diameters in the direction of strip travel, which are driven at the same rotational speed with resultant incremental reduction in their respective peripheral speeds, so that a plastic strip confined and conveyed between the series of rollers is progressively and forcibly shrunk throughout its length.

Further objects and advantages of the invention will be apparent to those skilled in the art to which it pertains from the following description of a presently preferred embodiment thereof, described with reference to the accompanying drawings, forming a part of the application, in which:

FIGURE 1 is a somewhat schematic, side elevational view of the apparatus with portions partially cut away to more clearly show the detailed construction thereof;

FIGURE 2 is a fragmentary, transverse sectional view taken along line 2—2 of FIGURE 1, and showing details of the vertical side supports and mounting arrangements for the corresponding shrinking rollers of each series of rollers; and FIGURE 3 is an enlarged, fragmentary, partially sectional view of a portion of FIGURE 1, showing in somewhat exaggerated fashion the reduction in diameter of the rollers of each series in the direction of travel of plastic strip material therebetween.

The apparatus of this invention, in its preferred embodiment, is employed to forcibly preshrink predetermined lengths of plastic material adaptable for use in, or as, a finished product without further trimming or stretching to longitudinal size. The material is forced in a hot plastic condition through a suitable shaping means, such as an extruder or calender, so that it emerges as an elongated, continuous strip of proper cross section. The strip so formed is then caused to pass between and in contact with a pair of upper and lower series of closely spaced driven rollers having incrementally reduced peripheral speeds in the direction of movement of the strip. This effects a retardation of the longitudinal travel of the strip while it is still at elevated temperature, thereby causing a forced shrinking of the strip, the extent of which shrinkage is such that there is now substantially no additional shrinkage after the strip has cooled. To additionally enhance the removal of the shrinkage forces in certain materials it is desirable to provide for continued heating of the strip material as it passes between the pair of roller series.

One form of the apparatus 10 for effecting shrinkage is illustrated in the drawings as including an upper shrinking assembly B and a lower shrinking assembly A; assembly A comprising spaced stanchions 11 to which are attached upper longitudinal supports 12 and lower longitudinal supports 13. Attached to the upper longitudinal supports 12 are spaced vertical side supports 14.

Journalled in bearings 15 mounted on the side support 14 of assembly A are a plurality of rollers 16. The rollers in the central portion of assembly A have diameters which are incrementally reduced from left to right, as viewed in FIGURE 1, and each have identical sprockets 17 attached to their ends 18 which extend through the vertical side supports 14. Passing about sprockets 17 is a drive chain 19 which also passes about idler sprockets 20 and 21 and a double drive sprocket 22. The sprocket 22 is driven directly from a speed reducer 23, which is connected to a drive motor not shown.

At the exit end of the apparatus 10 are mounted 4 vertical bearing supports 24. Slidably mounted on the supports 24 is a pivot support member 25. Pivotally mounted to support member 25 are the vertical frame members 26 of the upper shrinking assembly B. A pair of upper horizontal support members 27 connects each vertical frame member 26 with a corresponding support member 28 at the inlet end of the apparatus 10. The lower ends of vertical support members 26 and 28 are joined by vertical side support plates 29. Journalled between the support plates 29 by means of bearings 30 is a series of rollers 31. The rollers 31 are mounted on plates 29 in such a manner that in their normal operating position a plane defined by the axis of each roller 31 and the axis of its corresponding roller 16 of assembly A is perpendicular to the plane of the plastic material 32 passing therebetween. The rollers 31 also have diameters which are incrementally reduced from left to right as viewed in FIGURE 1 such that each roller 31 has the same diameter as its corresponding roller 16 is positioned beneath it. Each roller 31 has an identical sprocket 33 attached to its end 34 which passes through vertical support plates 29. Passing about sprockets 33 is a drive chain 35 which also passes about idler sprockets 36, 37 and 38 and a drive sprocket 39. Drive sprocket 39 is driven by means of a chain 40 trained thereabout and also trained about the double sprocket 22 and an adjustable tensioning sprocket 41.

The series of rollers 16 and the series of rollers 31 are each so arranged that the loci of their axes define a convex curve, which is preferably an inverted catenary. As is well known, a catenary is the natural curve which is formed by a chain supported only at its ends. Since the sprockets on each of the rollers of each series are identical, it follows that the driven chains 19 and 35 will also conform to the inverted catenary shape defined by the roller axes during contact with the roller sprockets. Hence, the chains 19 and 35 engage their respective sprockets 17 and 33 in such a manner as to eliminate the necessity for intermediate chain tensioning sprockets between the rollers, thereby permitting closer spacing of the rollers 16 and 31 of each series. This is desirable since the spacing between the rollers 16 and 31 should not be so great as to permit the particular hot plastic material being shrunk therebetween to drape or buckle appreciably between the rollers. Such draping would, by virtue of the gravitational forces acting upon the material between the rollers 16, induce a longitudinal stretching of the material, thus defeating the purpose of the invention.

The drive chains 19 and 35 are simultaneously tensioned about their respective sprockets 17 and 33 by adjusting the position of their respective idler sprockets 31 and 38.

The pivot support member 25 at the exit end of the apparatus 10 may be vertically positioned by means of an adjusting screw 42. A similar pair of adjusting screws 43 are mounted at the inlet end of the apparatus 10 whereby the rollers 31 may be appropriately spaced from the rollers 16, depending upon the thickness of the strip of plastic material 32 being shrunk therebetween. As support member 25 is raised or lowered the distance between centers of sprockets 39 and 22 is changed. To compensate for this change, idler sprocket 41 which is mounted on the upper longitudinal supports 12 may be moved either left or right, as the need may be, to properly tension the chain 40. It will be seen, therefore, that the entire upper assembly B may be raised, by means not shown, from its position of cooperation with the lower shrinking assembly A, being pivoted about shaft 44.

In order to provide additional heating of the plastic material 32 as it passes between rollers 16 and 31, heat lamps 45 are suspended from cross support members 46 of the upper assembly B.

The apparatus 10 of the invention may be used with any desired apparatus for forming plastic material into elongated strip or sheet form while in a hot plastic condition. Such forming apparatus is not shown here in view of the fact that it forms no part of the present invention.

In operation, a strip of plastic material 32 issues from a forming apparatus onto free wheeling rollers 16a mountat the material inlet end of assembly A and passes thereover to the driven rollers 16 and 31. Being freshly formed, the strip material 32 is in a hot plastic state. Because all of the rollers 16 and 31 have identical drive sprockets they are driven in the same rotational speed. However, due to the fact that their diameters are gradually reduced in the direction of travel of the strip 32 the respective peripheral speeds thereof are consequently gradually reduced. This gradual reduction in peripheral speed of the rollers 16 and 31 forces the strip 32 to contract longitudinally as it passes between the rollers, thus forcibly shrinking the strip 32 and thereby removing the residual stresses created in the strip at the time of its extrusion.

As the strip 32 leaves the driven rollers 16 and 31 it then passes onto free wheeling rollers 16b mounted at the material exit end of assembly A, and is taken from the apparatus 10 to further processing equipment by means of a conveyor 47.

The specific example which follows will serve to illustrate the amount of shrinking obtainable through the use of the invention. In the preferred embodiment of the invention as shown in the drawings the installation comprises 26 driven rollers 16, and 26 corresponding driven rollers 31. The first, or entrance corresponding shrinking rollers 16, 31 have an outside diameter of 2,250 inches, with each succeeding roller decreased in outside diameter by .010 inch, so that the last, or exit roller has a diameter of 2.000 inches. Thus, because the rollers have identical drive sprockets and are driven by a common drive, they will have the same rotational, but different peripheral speeds in the direction of movement of the strip 32. Based upon a peripheral speed of the first rollers 16, 31 of 540 inches per minute the last pair of corresponding rollers 16, 31 will have a peripheral speed determined by the following formula:

$$\frac{d_1}{d_2} = \frac{540}{x}$$

$$x = \frac{540 d_2}{d_1} = 480 \text{ inches per minute}$$

Hence, a strip passing between these particular series of rollers 16, 31 would be shrunk 11.11%.

It will be understood that the number of rollers, dimensions and speeds given in this specific example may be altered since, once the shrinkage characteristics of the particular plastic stock being processed are known, it is an easy matter to determine the necessary incremental differences between roller diameters to eliminate residual shrinkage and knowing the plastic properties of the material, the proper spacing between the rollers 16 and between the rollers 31 may be specified. By proper selection of these values, residual shrinkage of plastic material may be reduced to the point where the desired finished strip length, following its cutting, will not vary appreciably, even days following the formation thereof.

It will be understood that the foregoing disclosure relates to only a preferred embodiment of the invention and that numerous modifications or alterations may be made therein without departing from the spirit and the scope of the invention as set forth in the appended claims.

I claim:
1. An apparatus for the reduction of shrinkage in elongated plastic material; said apparatus comprising a first assembly; said first assembly having a plurality of material supporting rollers; a second assembly; said second assembly having a plurality of material confining rollers cooperative with said material supporting rollers to define a passageway therebetween; the outside diameter of each successive roller, on each assembly, in the direction of travel of said material being less than the diameter of the preceding roller by a predetermined increment; means rotatably mounting said rollers on each assembly axially parallel to one another with the distance between the peripheries of adjacent rollers on at least the first assembly being less than the diameter of the smallest of said rollers on said first assembly to prevent festooning of said material between said rollers of said first assembly; and means to rotate said rollers of each assembly jointly at a uniform speed of rotation to effect the removal of shrinkage from said material.

2. An apparatus as set forth in claim 1 wherein said first and second assembly have cooperative therewith heating means along said passageway to establish a predetermined temperature there along.

3. Apparatus for the forcible reduction of shrinkage in a plastic strip; comprising a material supporting assembly and a material confining assembly; said assemblies each further having a plurality of parallel strip confining rollers rotatably mounted thereon with the loci of their axes defining an inverted catenary curve, said rollers on said material supporting assembly cooperative with said material confining assembly to define a passageway which forcibly conveys sheet material therethrough, the outside diameter of each successive roller in the direction of travel of said strip being less than the diameter of the immediately preceding roller by a predetermined amount and the distance between the peripheries of adjacent rollers being less than the diameter of the smallest of said rollers to prevent festooning or buckling of said strip between said rollers, an identical sprocket mounted on each of said rollers, and an endless chain trained about all of said sprockets in series; and means to drive each of said chains in the direction of their lengths whereby all of said rollers of each assembly effect travel of said strip in the direction of its length while imposing a progressive shrinkage force thereon.

4. Apparatus as defined in claim 3, further comprising means pivotally joining said supporting assembly and said confining assembly for pivotal movement relative to one another.

5. Apparatus as defined in claim 4, further comprising means mounting said supporting assembly and said confining assembly for relative movement toward and away from one another.

6. Apparatus as defined in claim 5, further comprising means to heat said material while confined between said assemblies.

7. Apparatus as defined in claim 5, wherein each of the rollers of the supporting assembly is positioned in cooperative confining relationship with respect to a corresponding roller of said confining assembly such that the planes defined by the axes of corresponding rollers in each assembly are perpendicular to the plane of the strip material confined therebetween.

References Cited by the Examiner

UNITED STATES PATENTS

| 255,139 | 3/1882 | Burr | 18—2 X |
| 1,808,525 | 6/1931 | Cadden | 18—2 |
| 2,311,617 | 2/1943 | Hansen | 18—2 X |
| 2,767,432 | 10/1956 | Mooney | 18—2 X |
| 3,011,211 | 12/1961 | Barnes | 18—2 X |

WILLIAM J. STEPHENSON, *Primary Examiner.*